United States Patent
Cuan et al.

(10) Patent No.: US 10,791,114 B1
(45) Date of Patent: Sep. 29, 2020

(54) COMPUTING SYSTEMS UTILIZING GENERATED UNIQUE AUTHORIZATION IDENTIFIERS FOR AUTHORIZING USER OPERATIONS AND METHODS OF USE THEREOF

(71) Applicant: Capital One Services, LLC, McLean, VA (US)

(72) Inventors: Lukiih Cuan, Washington, DC (US); Dakyung Song, Arlington, VA (US); Vincent Vy Ngo, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/851,564

(22) Filed: Apr. 17, 2020

(51) Int. Cl.
| H04L 29/06 | (2006.01) |
| G06Q 40/02 | (2012.01) |
| G06Q 20/12 | (2012.01) |
| G06K 9/00 | (2006.01) |
| G06Q 50/26 | (2012.01) |
| G06Q 20/10 | (2012.01) |
| G06Q 20/40 | (2012.01) |
| G06Q 20/34 | (2012.01) |

(52) U.S. Cl.
CPC ...... *H04L 63/0861* (2013.01); *G06K 9/00288* (2013.01); *G06Q 20/108* (2013.01); *G06Q 20/127* (2013.01); *G06Q 20/34* (2013.01); *G06Q 20/4015* (2020.05); *G06Q 20/40145* (2013.01); *G06Q 40/02* (2013.01); *G06Q 50/265* (2013.01)

(58) Field of Classification Search
CPC .. H04L 63/0861; G06Q 40/02; G06Q 20/127; G06Q 50/265; G06Q 20/108; G06Q 20/40145; G06Q 20/34; G06Q 20/4015; G06K 9/00288
See application file for complete search history.

(56) References Cited

U.S. PATENT DOCUMENTS

| 10,157,504 | B1 * | 12/2018 | Jain ........................ G06F 21/31 |
| 10,158,646 | B1 * | 12/2018 | Desai .................. H04L 63/0853 |
| 10,574,650 | B2 * | 2/2020 | Wallace ................ G06F 21/316 |
| 2008/0022003 | A1 * | 1/2008 | Alve ..................... G01S 5/0009 |
| | | | 709/229 |
| 2011/0202466 | A1 * | 8/2011 | Carter ..................... H04L 63/08 |
| | | | 705/67 |

(Continued)

*Primary Examiner* — Darren B Schwartz
(74) *Attorney, Agent, or Firm* — Greenberg Traurig, LLP

(57) ABSTRACT

In some embodiments, an exemplary method may include receiving by a computing device of a user, first facial image data of the user for identity verification from an authorizing entity for authorizing user operations in computing systems managed by a plurality of entities. Second facial image data of the user is obtained using an imaging device of the computing device at a predefined location of a particular entity from the plurality of entities for authenticating the user. A unique authorization identifier is displayed of the computing device of the user. A location of the computing device and a timestamp when a computing terminal of the particular entity scans the unique authorization identifier on the computing device of the authenticated user and an authorization request is relayed to the authorizing entity. An approval is received based on verification of the unique authorization identifier generated for the particular entity, the location of the computing device, and the timestamp.

20 Claims, 10 Drawing Sheets

(56) References Cited

U.S. PATENT DOCUMENTS

| | | | |
|---|---|---|---|
| 2014/0283113 A1* | 9/2014 | Hanna | G06K 9/00067 |
| | | | 726/27 |
| 2014/0333413 A1* | 11/2014 | Kursun | G06K 9/00892 |
| | | | 340/5.52 |
| 2015/0082390 A1* | 3/2015 | Flink | H04W 12/06 |
| | | | 726/4 |
| 2015/0242601 A1* | 8/2015 | Griffiths | G06F 21/31 |
| | | | 726/5 |
| 2015/0242605 A1* | 8/2015 | Du | H04W 12/0605 |
| | | | 726/7 |
| 2018/0248863 A1* | 8/2018 | Kao | H04L 63/08 |
| 2019/0014107 A1* | 1/2019 | George | H04L 69/18 |
| 2019/0095736 A1* | 3/2019 | Stahlfeld | G06K 9/00892 |
| 2019/0213311 A1* | 7/2019 | Tussy | G06K 9/00892 |

* cited by examiner

COMPUTING SYSTEMS UTILIZING GENERATED UNIQUE AUTHORIZATION IDENTIFIERS FOR AUTHORIZING USER OPERATIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computing systems and more specifically to computing systems utilizing generated unique authorization identifiers for authorizing user operations and methods of use thereof.

BACKGROUND OF TECHNOLOGY

A computer network platform/system may include a group of computers (e.g., clients, servers, smart routers and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of:
 receiving, by a processor of a computing device associated with a user over a communication network, first facial image data of the user for identity verification of the user in a first computing system managed by an authorizing entity for authorizing user operations in a plurality of computing systems managed by a plurality of entities;
 generating, by the processor of the computing device, a first identity verification record of the user based on the first facial image data of the user;
 wherein the first identity verification record is stored in a memory of the computing device;
 obtaining, by the processor of the computing device, using an imaging device of the computing device, second facial image data of the user at a predefined location of a particular entity from the plurality of entities;
 authenticating, by the processor, the user to use the computing device at the predefined location of the particular entity from the plurality of entities to perform at least one operation in a second computing system from the plurality of computing systems managed by the particular entity from the plurality of entities when the first facial image data matches the second facial image data;
 relaying, by the processor over a communication network to the first computing system of the authorizing entity, a request from the authenticated user for at least one unique authorization identifier;
 wherein the request may include an identification of the particular entity;
 receiving, by the processor over the communication network, the at least one unique authorization identifier generated by the first computing system;
 causing, by the processor, to display the at least one unique authorization identifier on a display of the computing device of the user;
 receiving, by the processor, a location of the computing device and a timestamp when a computing terminal of the particular entity scans the at least one unique authorization identifier displayed on the display of the computing device of the authenticated user;
 relaying, by the processor to the first computing system, an authorization request to the first computing system over the communication network;
 wherein the authorization request may include the at least one unique authorization identifier generated for the particular entity, the location of the computing device, and the timestamp;
 receiving, by the processor over the communication network from the first computing system, in response to the authorization request, an approval for the user to perform the at least one operation in the second computing system managed by the particular entity during a predefined time interval; and
 wherein the approval is generated when the first computing system verifies that:
  (i) the location of the computing device matches the predefined location of the computing terminal managed by the particular entity; and
  (ii) the timestamp that the at least one unique authorization identifier was scanned is within the predefined time interval.

In some embodiments, the present disclosure provides an exemplary technically improved computer-based system that includes at least the following components of a memory and a processor. The processor may be configured to:
 receive over a communication network, first facial image data of a user for identity verification of the user in a first computing system managed by an authorizing entity for authorizing user operations in a plurality of computing systems managed by a plurality of entities;
 generate first identity verification record of the user based on the first facial image data of the user;
 wherein the first identity verification record is stored in a memory of the computing device;
 obtain using an imaging device of the computing device, second facial image data of the user at a predefined location of a particular entity from the plurality of entities;
 authenticate the user to use the computing device at the predefined location of the particular entity from the plurality of entities to perform at least one operation in a second computing system from the plurality of computing systems managed by the particular entity from the plurality of entities when the first facial image data matches the second facial image data;
 relay over the communication network to the first computing system of the authorizing entity, a request from the authenticated user for at least one unique authorization identifier;
 wherein the request may include an identification of the particular entity;
 receive the at least one unique authorization identifier generated by the first computing system;
 cause to display the at least one unique authorization identifier on a display of the computing device of the user;

receive a location of the computing device and a timestamp when a computing terminal of the particular entity scans the at least one unique authorization identifier displayed on the display of the computing device of the authenticated user;

relay an authorization request to the first computing system over the communication network;

wherein the authorization request may include the at least one unique authorization identifier generated for the particular entity, the location of the computing device, and the timestamp;

receive from the first computing system, in response to the authorization request, an approval for the user to perform operations in the second computing system managed by the particular entity during a predefined time interval; and wherein the approval is generated when the first computing system verifies that:

(i) the location of the computing device matches the predefined location of the computing terminal managed by the particular entity; and (ii) the timestamp that the at least one unique authorization identifier was scanned is within the predefined time interval.

In some embodiments, the present disclosure provides an exemplary technically improved computer-based method that includes at least the following steps of:

sending, by a processor of a server of a first computing system managed by an authorizing entity, first facial image data of the user for identity verification of the user for authorizing user operations in a plurality of computing systems managed by a plurality of entities to a computing device associated with a user over a communication network;

receiving, by the processor, a request for at least one unique authorization identifier from the computing device;

wherein the request may include an identification of a particular entity from the plurality of entities;

wherein the user is authenticated to use the computing device at a predefined location of the particular entity from the plurality of entities to perform at least one operation in a second computing system from the plurality of computing systems managed by the particular entity from the plurality of entities;

generating, by the processor, the at least one unique authorization identifier for the particular entity identified in the request;

sending, by the processor, the at least one unique authorization identifier to the computing device over the communication network;

receiving, by the processor, an authorization request over the communication network from the computing device;

wherein the authorization request may include the at least one unique authorization identifier generated for the particular entity, a location of the computing device, and a timestamp when a computing terminal managed by the particular entity scans the at least one unique authorization identifier displayed on a display of the computing device of the authenticated user; and authorizing, by the processor, in response to the authorization request, the user to perform the at least one operation in the second computing system managed by the particular entity during a predefined time interval upon verifying that:

(i) the location of the computing device matches the predefined location of the computing terminal managed by the particular entity; and (ii) the timestamp that the at least one unique authorization identifier was scanned is within the predefined time interval;

sending, by the processor, to the computing device over the communication network, an approval for the user to perform the at least one operation in the second computing system using the computing device during the predefined time interval.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
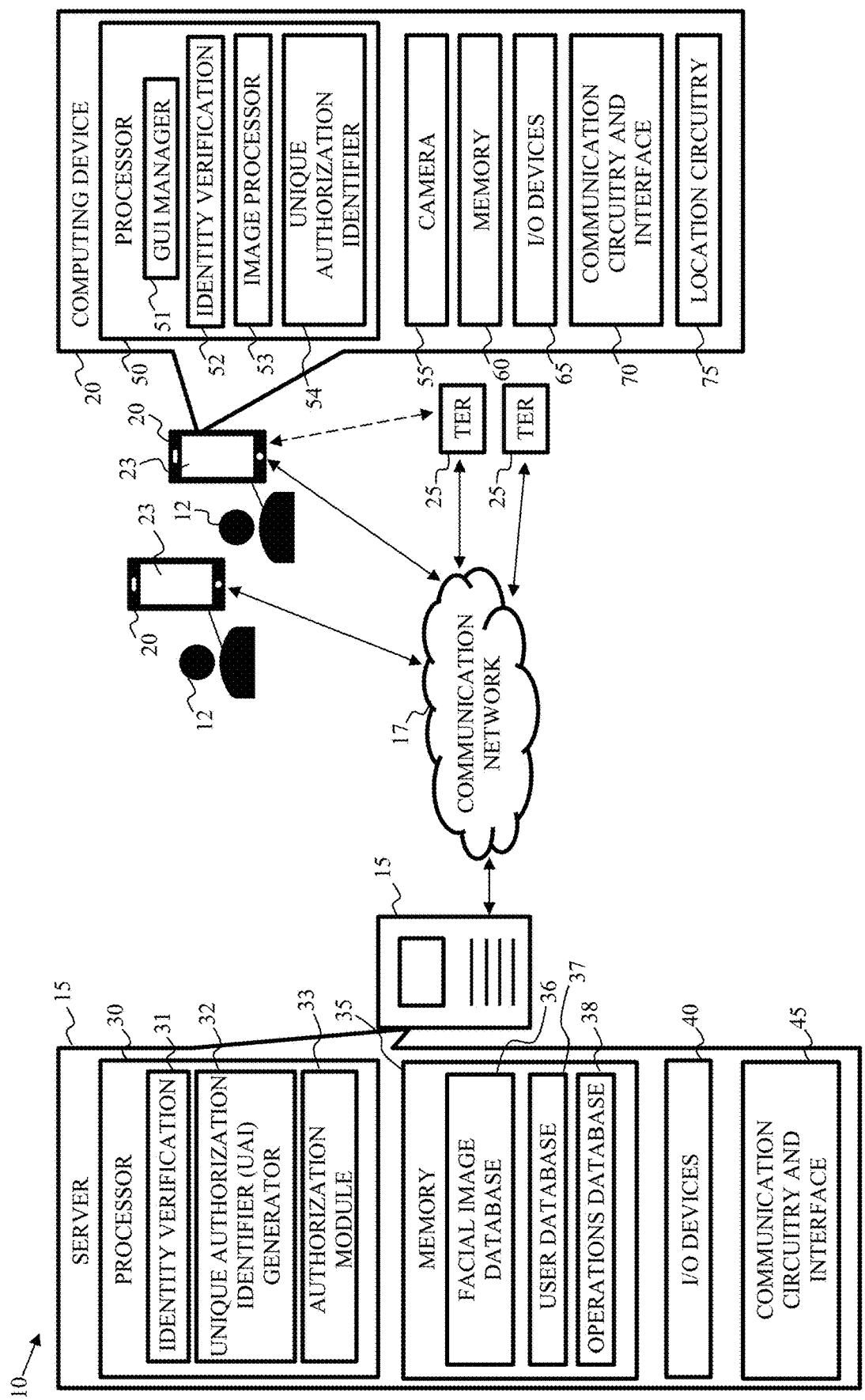
FIG. 1 depicts a system for generating unique authorization identifiers for authorizing user operations in a computing system, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe systems and methods for generating unique authorization identifiers for authorizing user operations in a computing system. A computing device associated with a user may be used to perform operations in a computing system of a particular entity. The particular entity may be a merchant or retail store, for example, and the operations may be the purchase of goods and/or services from the particular entity. The user may have an account, such as a credit card and/or debit card account managed by an authorizing entity such as a financial institution or bank.

The term "entity" or "particular entity" may refer to a person, an individual, a group of individuals, a partnership, an organization, and/or a business. The particular entity may perform operations or transactions with users, such as customers of the particular entity, on computing terminals managed by the particular entity.

The term "authorizing entity" may refer to an entity that is designated as a trusted or authoritative entity of a network of entities, where the network of entities may manage respective computing servers and/or computing devices and/or or computing terminals that communicate over a communication network. The authorizing entity may be entrusted with one or more exclusive roles, such as generating electronic certificates and/or designations identifying permitted activities and/or operations permitted within the computing servers and/or computing devices of the network of entities communicating over the communication network. The term "authorizing entity" may be refer to a financial institution or bank, for example.

The user may wish to purchase good and/or services from a merchant and/or a retail store but may not have the credit card, for example. To complete the transaction without the credit card, the user may choose to use an application running on a computing device of the user, such as the user's smartphone or tablet, which is communicating with the authorizing entity over a communication network.

In some embodiments, the application may authenticate the user to use the user's smartphone to complete the transaction with the merchant by requesting that the user provide identity verification by acquiring a photograph of the user (e.g., a selfie) using an imaging device of the computing device, such as a camera.

In some embodiments, the application may be configured to add a number of steps adding more protection against fraudulent activity. For example, once the user is authenticated to use the computing device to perform operations in a computing system of the particular entity, the application may request that the user indicate the name of the particular entity (e.g., the merchant name). The authorizing entity via the application may then issue a unique authorization identifier, such as a virtual credit card number, for example. The unique authorization number may be generated only for the user, the user device (device fingerprint), the particular entity, or any combination thereof. The unique authorization number may be linked to the user's account with the authorizing entity and may be valid for a predefined time interval.

In some embodiments, the application may then display the unique authorization identifier on the display of the user's computing device, which may be scanned by a computing terminal of the particular entity within the predefined time interval. The computing terminal of the particular entity may be a point-of-sale (POS) terminal of a merchant. Once scanned, a transaction authentication request may then be relayed to a server of the authorizing entity over the communication network.

In some embodiments, the server may validate that the location of the user's computing device and/or the location of the POS terminal matches the known location of the POS terminal associated with the particular entity and that the timestamp of the transaction is within the predefined time interval established when generating the unique authorization number. Once validated, the server of the authorizing entity may send an approval of the transaction to the merchant and/or user. Hence, the authorizing entity may approve the transaction with the user when the transaction is performed on a computing system of the particular entity (e.g., merchant) for which the unique authorization number was generated, a location of the user computing device and/or a location of the POS terminal associated with the particular entity, and the time (e.g., timestamp) of the transaction is within the predefined time interval established when generating the unique authorization number.

FIG. 1 depicts a system 10 for generating unique authorization identifiers for authorizing user operations in a computing system, in accordance with one or more embodiments of the present disclosure. System 10 may include a server 15 managed by an authorizing entity, a computing device 20 of user 12, and a computing terminal 25 managed by a particular entity all communicating over a communication network 17.

In some embodiments, computing device 20 may include a processor 50, an imaging device such as a camera 55, a memory 60, input/output (I/O) devices 65, such as a touchscreen 23, communication circuitry and interface 70 for communicating over communication network 17, and location circuitry 75 for detecting a location of the computing device, such as global positioning system (GPS) circuitry. In some embodiments, the imaging device may include a camera (e.g., mechanical, digital, or electronic viewing device), still camera, camcorder, motion picture camera, or any other instrument, equipment, or format capable of recording, storing or transmitting an image as image data. Camera 55 may be integrated in computing device 20.

Processor 50 of computing device 20 may execute software stored in memory 60, such as an application, which may include the following software modules: a graphic user interface (GUI) manager 51, an identity verification module 52, an image processing module 53, and a unique authorization identifier module 54 for managing the unique authorization identifier. Similarly, processor 30 may execute software stored in memory 35, which may include the following software modules: an identity verification module 31, unique authorization identifier (UAI) generator 32, and an authorization module 33. Memory 35 may include a facial image database 36, a user database 37, and an operations database 38.

In the context of this present disclosure, an application executed by processor 50 may include at least the software modules: GUI manager 51, identity verification 52, image processor 53, and/or unique authorization identifier 54 for managing the UAI received from UAI generator 32 over communication network 17.

In some embodiments, server 15 managed by an authorizing entity may include a processor 30, a memory 35, input/output (I/O) devices 40, and communication circuitry and interface 45 for communicating over communication network 17.

In some embodiments, computing terminal 25 managed by the particular entity may similarly include (not shown) a processor, a memory, input/output (I/O) devices, location circuitry, such as GPS, for identifying the location of computing terminal 25, and communication circuitry and interface for communicating over communication network 17.

The embodiments taught herein solve the technical problem of authorizing a user to perform operations in a computing system of a particular entity by using a unique authorization identifier generated for the particular entity to be used at a particular location and within a predefined time interval. For example, a user may be at a store of a merchant, and the merchant may issue a store credit card, or a reward credit card that the user does not normally carry on the user's person. Thus, the user may not have the store credit card to make purchases while visiting the store. Instead of the user having to retrieve the physical credit card, the user may use software, such as an application, running on the user's computing device, such as a mobile smartphone, to perform the transaction with the merchant in lieu of the store credit card.

To implement this in a secure manner, exemplary embodiments taught herein provide extra layers of security to prevent fraudulent activities by issuing a unique authorization identifier, such as a virtual credit card number, for example, that is unique for a user, unique to the user's computing device (e.g., device footprint), a particular entity, a predefined specific location associated with the computing terminal of the particular entity, and/or a predefined time interval in which to complete the operations on the computing system of the particular entity through the computing terminal of the particular entity.

In the embodiments taught herein, when user 12 uses the unique authorization identifier at computing terminal 25 of the particular entity, the information about the user operations in the computing system of the particular entity (e.g., transaction information about the user at a merchant's POS terminal) is relayed over the communication network to server 15 of the authorizing entity, such as a financial institution. The authorizing entity may approve the operation in the computing system of the particular entity after 1) verifying the user to use the computing device to perform the operation, and 2) verifying that the unique authorization identifier is used by the verified user using the user's computing device at a computing terminal located at a predefined location (e.g., known location) associated with the particular entity and within a predefined time interval after the unique authorization identifier is generated.

Although one technical application for the exemplary embodiments described herein relates to the use of a virtual credit card number generated by a server of a financial institution which allows a user to perform transactions with a merchant, for example, this is not by way of limitation of exemplary embodiments taught herein. The exemplary embodiments may be applied to a variety of computing applications where a user may securely perform operations in a computing system of any entity using the user's computing device where the operations are authorized by an authorizing entity.

In some embodiments, authorization module 33 may query the location of computing device 20 and may further match the device location to the location of POS terminal 25 of the particular entity for additional security. Both POS terminal 25 and/or computing device 20 may include GPS circuitry to determine the locations of the respective devices.

In some embodiments, the unique authorization identifier may be generated for a specific software application including an identification number, a serial number, and/or registration number of the software application operating on computing device 20.

In some embodiments, agents of the particular entity may authorize the user to use the computing device to perform the operations in the computing system of the particular entity. Customer service representatives of a financial institution issuing a credit card to the user may validate the user to use the user's smartphone by any suitable validation procedure such as by telephone (voice), texting, chat, for example, and to send to the smartphone, a generated virtual credit card number to be used by the user at the merchant's POS terminal to complete a transaction.

In some embodiments, the application communicating with the financial institution may be used to validate user 12 by requesting user 12 to input personal identification information into computing device 20 (e.g., in a graphic user interface managed by GUI manager 51, such as a driver license number and/or a government identification number and/or an image of the requested document with personal data, for example.

In some embodiments, the application may request the user to place a finger on a fingerprint reader of computing device 20 to authenticate the user.

In some embodiments, the application may request the user to take a selfie with the smartphone camera. The image data of the selfie may be relayed to the backend server of the financial institution and compared to a previously-stored facial image data of the user on the backend server (e.g., server 15).

Figure 2B:
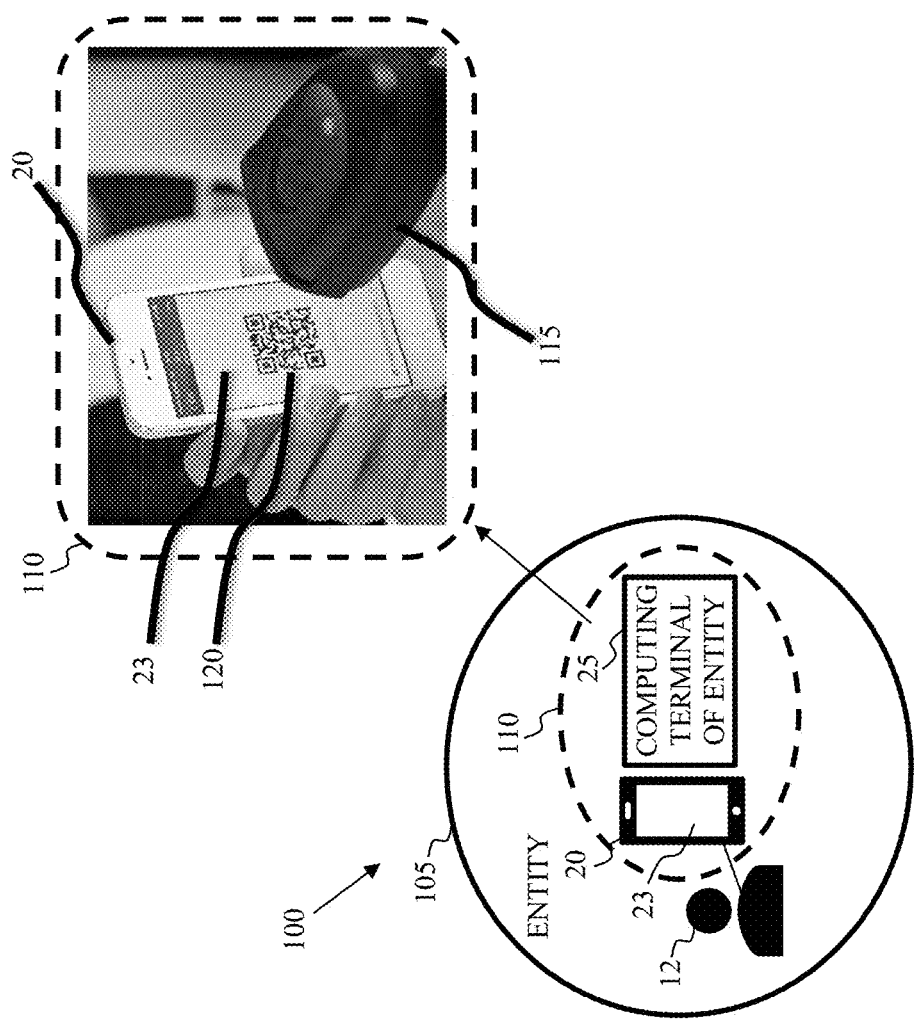
FIG. 2B shows a computing terminal scanner scanning at least one unique authorization identifier, in accordance with one or more embodiments of the present disclosure.
Figure 2A:
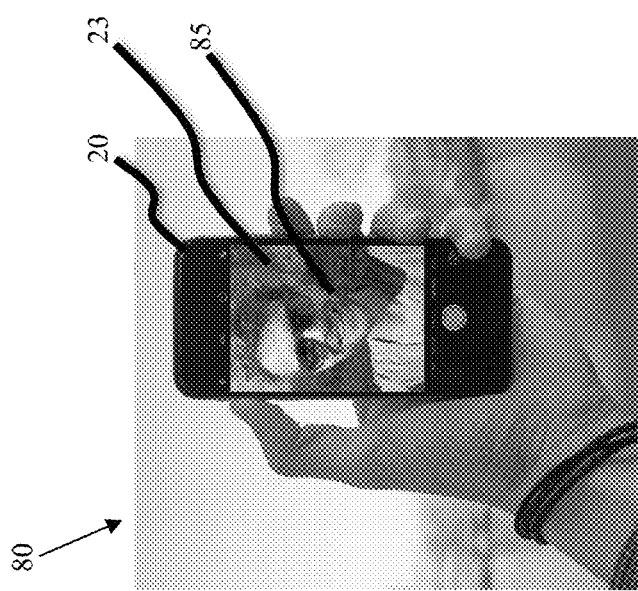
FIG. 2A shows a facial image acquired by a computing device for authenticating a user, in accordance with one or more embodiments of the present disclosure.

FIG. 2A shows a facial image 85 acquired by a computing device 20 for authenticating a user 12, in accordance with one or more embodiments of the present disclosure. As a method for authenticating user 12 to use computing device 20 for performing operations in a computing system of the particular entity, such as POS terminal 25 of a merchant, GUI manager 51 may prompt user 12 on display 23 to use camera 55 to acquire 80 facial image data of user 12 (e.g., a selfie 85) as shown in FIG. 2A by a hand of user 12 holding the smartphone to take a picture of himself.

In some embodiments, identity verification module 52 may receive over communication network 17 from facial image database 36, reference facial image data of user 12 known herein as first facial image data of user 12. The first facial image data of user 12 may be previously stored on server 15, when the account of user 12 was setup with the authorizing entity, for example. The first facial image data may be stored as an identity verification record in memory 60 on computing device 20 also known herein as a first identity verification record.

In some embodiments, image processor 53 may be used to compare facial image data of a user's face 85 acquired by camera 55, known herein as second facial image data, to the first (reference) facial image data of user 12. If second facial image data (e.g., from selfie 85) matches the first (reference) facial image data of user 12, the comparison performed by image processor 53 on computing device 20 may be used to verify the identity of user 12 and authenticate user 12 to use computing device 20 to perform operations on the computing system of the particular entity. Specifically, identity verification module 31 on server 15 or identity verification module 52 on computing device 20 may authenticate user 12 to use computing device 20 to perform operations on computing terminal 25 when the first and second images match.

In some embodiments, image processor 53 may assess whether the first image data matches the second image data, for example, using any suitable facial image similarity algorithms such as Amazon Rokognition, for example. The algorithm may analyze facial features in the first and second image data, and may output a similarity score. Image processor 53 may determine that the first and second images match when the similarity score is greater than a predefined similarity score threshold, such as 90% or higher, for example.

In some embodiments, image processor 53 may apply an algorithm that maps facial features in the first and second facial image data to a facial feature n-dimensional space, for example, where n is any integer. Image processor 53 may compute a distance between a vector of the facial features in the first facial image data mapped in the facial feature space to a vector of the facial features in the second facial image data in the facial feature space. Image processor 53 may determine that the first and second images match when the computed distance is below a predefined distance threshold.

In some embodiments, once the user is authorized to use the computing device to perform a transaction at a POS terminal of a merchant either by computing device 20 (e.g., by identity verification module 52) and/or on server 15 (e.g., by identity verification module 31), software running on the computing device may prompt the user to input the name of the particular entity, such as the merchant name, for example.

In some embodiments, the name of the particular entity may be relayed to server 15. UAI generation 32 running on processor 30 may generate a unique authorization identifier specific to the user and the particular entity, such as a virtual credit card number specific to the user-specified merchant. The virtual credit card number may be valid for a predefined time interval after generation such as 5 minutes, 15 minutes, 30 minutes, 45 minutes, 1 hour, 2 hours, for example. This time interval may be long enough to allow the user to shop, for example, in the merchant's store that then arrive to the checkout POS terminal of the merchant to pay for the goods and/or services using the generated virtual credit card number.

In some embodiments, user 12 may select the validity time (e.g., the predefined time interval) of the unique authorization identifier on computing device 20.

In some embodiments, the unique authorization identifier may be uniquely generated for a specific merchant, a specific user, and/or a specific computing device (e.g., smartphone).

In some embodiments, the unique authorization identifier may be displayed on display 23 of computing device 20 in any suitable format such as a quick response (QR) code, a barcode, and a personal account number (PAN) code, for example. The displayed unique authorization identifier may then be scanned by computing terminal 25 of the particular entity to initiate an authorization of the operations on the computing system of the particular entity, such as a transaction with the merchant.

In some embodiments, authorization module 33 may send a request over communication network 17 to computing device 20 for an application running on computing device 20 to send a token for authenticating the authenticity of the application before approving the user operations on the particular entity (e.g., a user transaction with a merchant).

FIG. 2B shows a computing terminal scanner 115 scanning unique authorization identifier 120, in accordance with one or more embodiments of the present disclosure. Once user 23 is verified to the use computing device 20, user 12 may perform operations in the computing system through computing terminal 25 at a predefined location 105 of the particular entity using the unique authorization identifier. In an exemplary embodiment shown in FIG. 2B, the unique authorization identifier may be displayed on display 23 as a QR code 120 that may be scanned 110 by computing terminal scanner 115 communicatively coupled to POS terminal 25.

Figure 3:
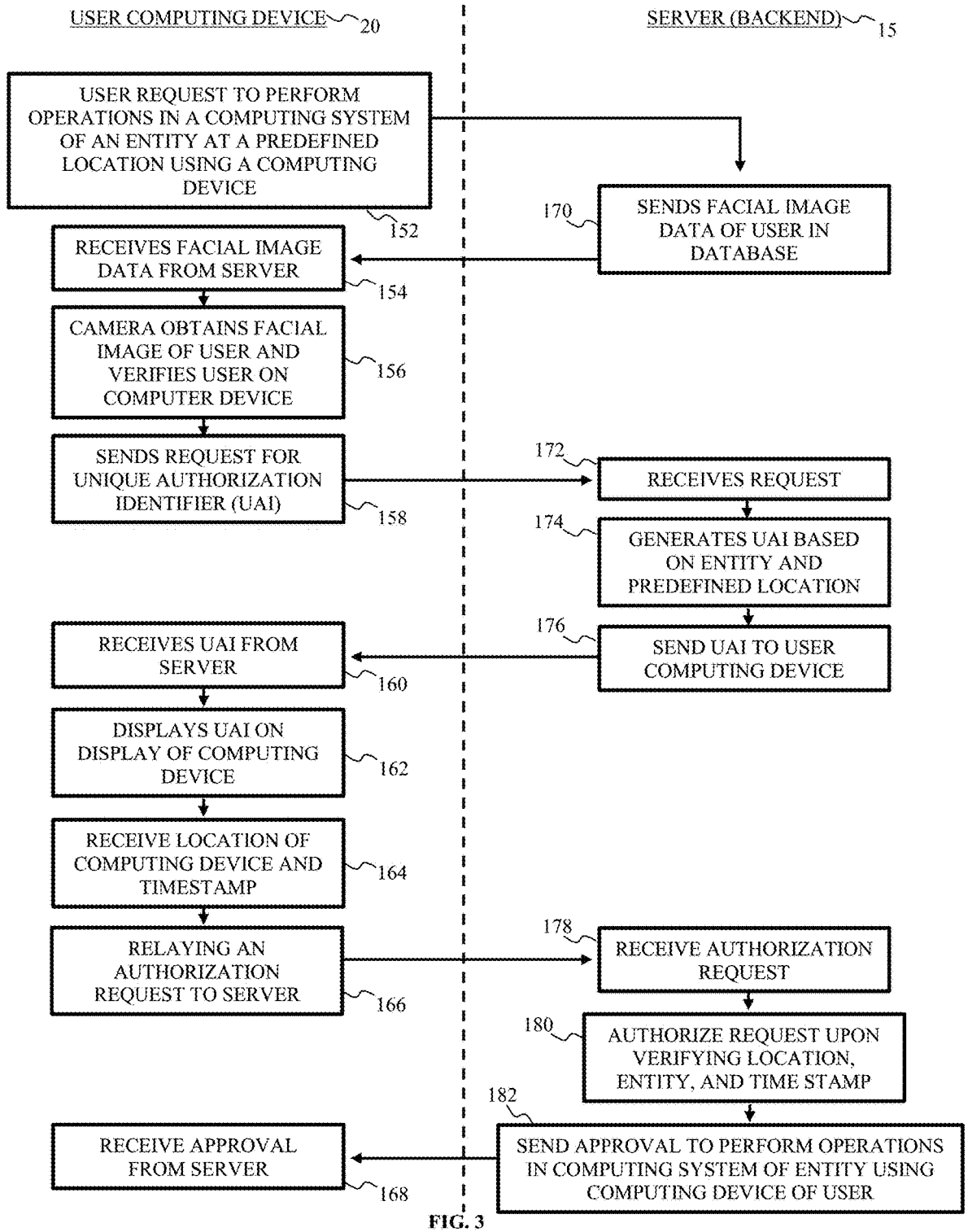
FIG. 3 shows a flow diagram for generating unique authorization identifiers for authorizing user operations in a computing system, in accordance with one or more embodiments of the present disclosure.

FIG. 3 shows a flow diagram for generating unique authorization identifiers for authorizing user operations in a computing system, in accordance with one or more embodiments of the present disclosure. In an exemplary embodiment shown in FIG. 3, the left side of the flow diagram of FIG. 3 shows the processes performed by processor 50 by user computing device 20 while the right side shows the processes performed by processor 30 of server 15 of the authorizing entity, such as a financial institution.

In some embodiments, a user may log onto an application or may initiate a graphic user interface such as a web page to request to perform operations in a computing system of a particular entity, such as a merchant or retail store, for example, using computing device 20 as in a step 152. In other embodiments, the request may specify a predefined location of the entity, such as a specific branch of the merchant and/or the retail store, for example. The request may be relayed to server 15 over communication network 17.

In some embodiments, server 15 (e.g., processor 30) may send facial image data of user 12 stored in facial image database 36 to processor 50 of computing device 20 over communication network 17 in response to the request in a step 170.

Processor 50 may receive the facial image data from server 15 in a step 154. Camera 55 may obtain facial image data of user 12. Processor 50 may compare the facial image data acquired by camera 55 to the reference facial data relayed by server processor 30 over the communication network. If image processor 53 assesses that the acquired and reference facial image data of user 12 match, identity verification module 52 may verify the identity of user 12 and authenticate user 12 thus allowing user 12 to performing operations in the computing system of the particular entity with computing device 20 in a step 156. Optionally, and/or alternatively, in other embodiments, computing device 20 may relay or send the acquired facial image data of user 12 to server 15 over communication network 17. Identity verification module 31 on server 15 may authenticate the identity of user 12 to allow user 12 to perform operations in the computing system of the particular entity.

Note that the terms relay and send over the communication network may be used herein synonymously.

In some embodiments, processor 50 send a request over communication network 17 to server 15 for a unique authorization identifier (UAI) in a step 158.

In some embodiments, server 15 may receive the request for a UAI in a step 172. UAI generator 32 may generate the UAI based on the particular entity designated by user 12, such as a merchant and/or a retail store and a predefined location associated with the particular entity either designated by the user and/or known from databases in a step 174. Processor 30 may relay or send over communication network 17, the generated UAI to user computing device 20 in a step 176. Processor 50 of user computing device 20 may receive the UAI from server 15 in a step 160.

In some embodiments, GUI manager 51 may display the UAI on display 23 of user computing device 20 in a step 162.

In some embodiments, computing terminal scanner 115 coupled to computing terminal 25 may scan unique authorization identifier 120 displayed on display 23, for example, as QR code 120 in FIG. 2B. For example, a user may be shopping in a store collecting store items to buy and proceeds to the checkout counter. At checkout, the checkout agent may scan QR code 120 displayed on display 23 using computing terminal scanner 115. The computing system of the particular entity coupled to server 15 of the authorizing entity may send a transaction approval request to server 15 with details of the transaction with user 12 for the computing system of the particular entity.

In some embodiments, user computing device 20 may receive a location of the computing terminal 25 and/or a location of user computing device 20 from a GPS system. In other embodiments, the location of computing terminal 25 may be stored in operations database 38 in server 15. When the QR code is scanned by computing terminal scanner 115, a timestamp of the operations in the computing system of the particular entity may be received and/or recorded in a step 164.

The term timestamp may refer to the data and time that is recorded and/or stored in memory in computing system of the particular entity and/or the computing device of the user when the user performs operations in the computing system of the particular entity using the computing device of the user. In other embodiments, the timestamp may be the recorded data and time that QR code 120 is scanned by computing terminal scanner 115.

In some embodiments, processor 50 may relay over communication network 17 to server 15, an authorization request in a step 166 for approval to perform the operations in the computing system of the entity via computing terminal 25 using computing device 20 of user 12. The authorization request may include any of: (1) the user name, (2) the unique authorization identifier, (3) the name of the particular entity chosen by the user, (4) a predefined location associated with the particular entity, and (5) a timestamp when the operations are performed (e.g., a timestamp of a merchant transaction).

In some embodiments, server 15 managed by the authorizing entity may receive the authentication request from user computing device 20 in a step 178. Server 15 of the authorizing entity may authorize the authentication request in a step 180 when verifying that the operations on the computing terminal 25 may be performed using the location of computing device 20 of user 12 when (1) the computing device is at the predefined location, (2) the name of the particular entity managing computing terminal 25 matches the name of the entity stipulated in the unique authentication identifier, and (3) that the timestamp of the performed operation is within the predefined time interval as defined in the generated unique authentication identifier. When these three conditions hold, authorization module 33 on server 15 of the authorizing entity generates an approval of the authentication request. Otherwise, the request to perform operations is rejected.

In some embodiments, server 15 may send to computing device 20 and/or to POS terminal 25 over communication network 17, an approval for user 12 to perform operations in the computing system of the entity through computing terminal 25 in a step 180.

In some embodiments, computing device 20 may receive the approval in a step 168.

In some embodiments, server 15 may register the approval or rejection of the authentication request in user database 37 and/or in operations database 38.

Figure 4:
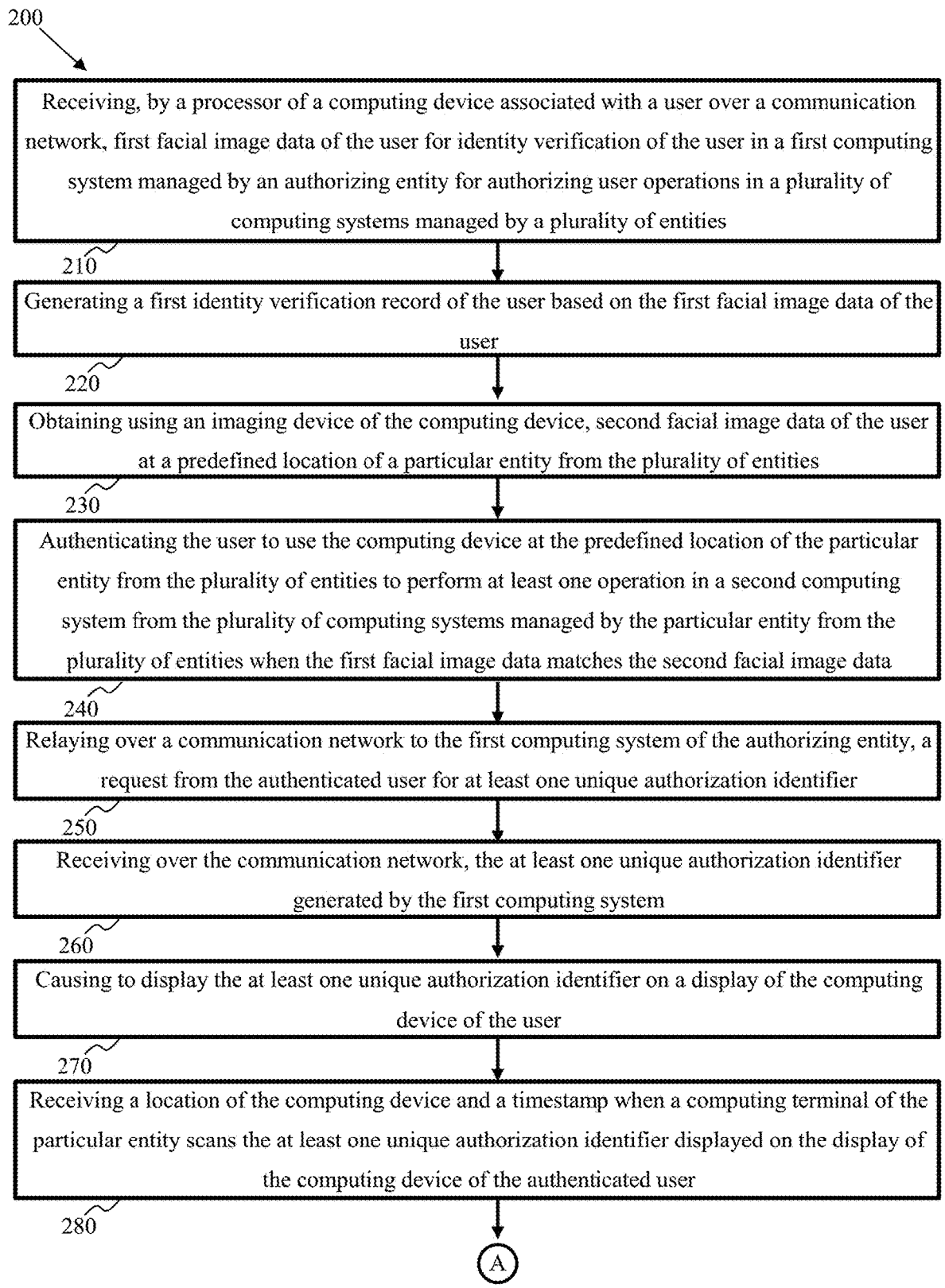
FIG. 4 is a flowchart of a method for a computing device to perform operations in a computing system of an entity, in accordance with one or more embodiments of the present disclosure.
Figure 4:
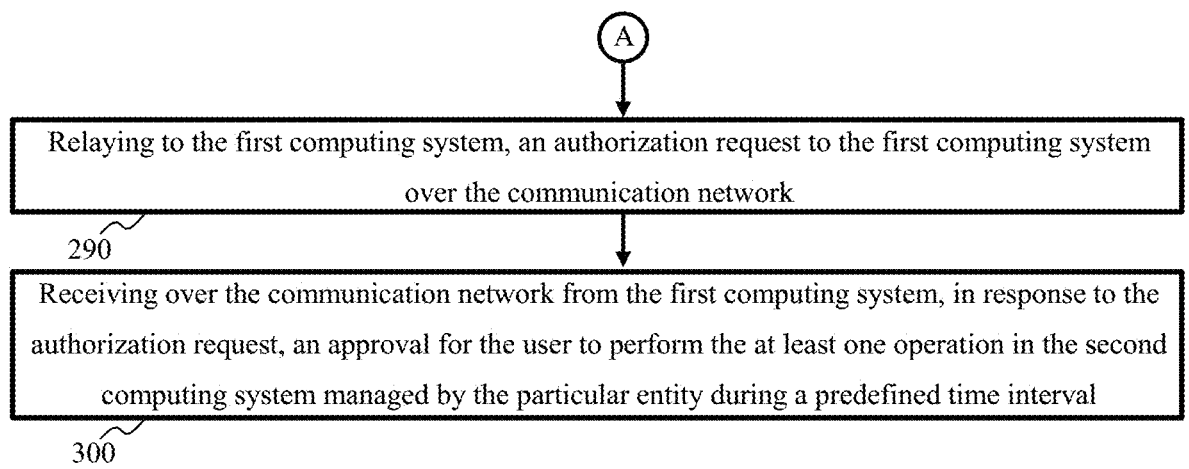

FIG. 4 is a flowchart of a method 200 for a computing device to perform operations in a computing system of an entity, in accordance with one or more embodiments of the present disclosure. Method 200 may be performed by processor 50 of computing device 20.

Method 200 may include receiving 210, by a processor of a computing device associated with a user over a communication network, first facial image data of the user for identity verification of the user in a first computing system managed by an authorizing entity for authorizing user operations in a plurality of computing systems managed by a plurality of entities.

Method 200 may include generating 220 a first identity verification record of the user based on the first facial image data of the user.

Method 200 may include obtaining 230 using an imaging device of the computing device, second facial image data of the user at a predefined location of a particular entity from the plurality of entities.

Method 200 may include authenticating 240 the user to use the computing device at the predefined location of the particular entity from the plurality of entities to perform at least one operation in a second computing system from the plurality of computing systems managed by the particular entity from the plurality of entities when the first facial image data matches the second facial image data.

Method 200 may include relaying 250 over a communication network to the first computing system of the authorizing entity, a request from the authenticated user for at least one unique authorization identifier.

Method 200 may include receiving 260 over the communication network, the at least one unique authorization identifier generated by the first computing system.

Method 200 may include causing 270 to display the at least one unique authorization identifier on a display of the computing device of the user.

Method 200 may include receiving 280 a location of the computing device and a timestamp when a computing terminal of the particular entity scans the at least one unique authorization identifier displayed on the display of the computing device of the authenticated user.

Method 200 may include relaying 290 to the first computing system, an authorization request to the first computing system over the communication network.

Method 200 may include receiving 300 over the communication network from the first computing system, in response to the authorization request, an approval for the user to perform the at least one operation in the second computing system managed by the particular entity during a predefined time interval.

Figure 5:
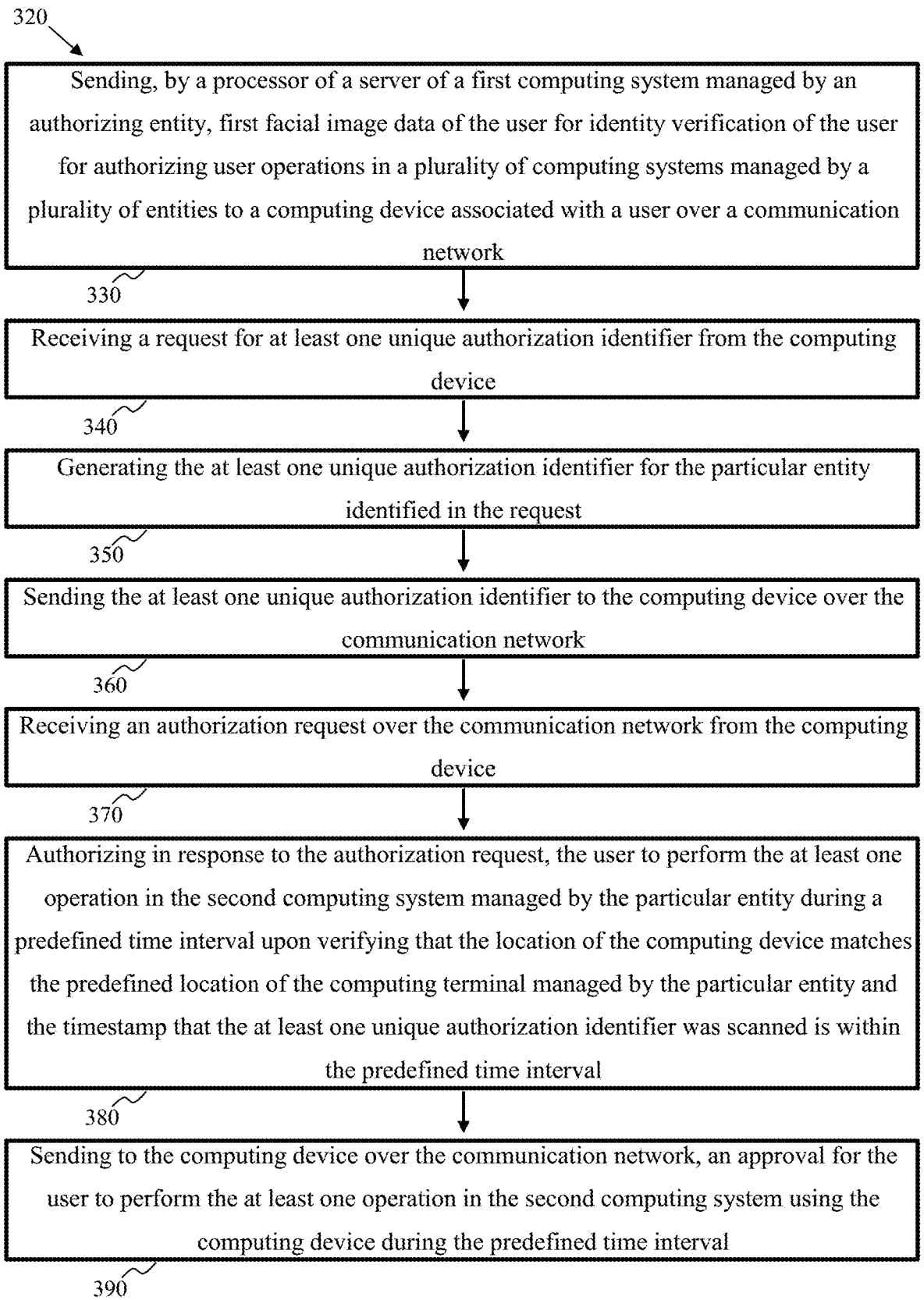
FIG. 5 is a flowchart of a method of a server of an authorizing entity authorizing a computing device to perform operations in a computing system of an entity, in accordance with one or more embodiments of the present disclosure.

FIG. 5 is a flowchart of a method 320 of a server of an authorizing entity authorizing a computing device to perform operations in a computing system of an entity, in accordance with one or more embodiments of the present disclosure. Method 320 may be performed by processor 30 of server 15.

Method 320 may include sending 330, by a processor of a server of a first computing system managed by an authorizing entity, first facial image data of the user for identity verification of the user for authorizing user operations in a plurality of computing systems managed by a plurality of entities to a computing device associated with a user over a communication network.

Method 320 may include receiving 340 a request for at least one unique authorization identifier from the computing device.

Method 320 may include generating 350 the at least one unique authorization identifier for the particular entity identified in the request.

Method 320 may include sending 360 the at least one unique authorization identifier to the computing device over the communication network.

Method 320 may include receiving 370 an authorization request over the communication network from the computing device.

Method 320 may include authorizing 380 in response to the authorization request, the user to perform the at least one operation in the second computing system managed by the particular entity during a predefined time interval upon verifying that the location of the computing device matches the predefined location of the computing terminal managed by the particular entity and the timestamp that the at least one unique authorization identifier was scanned is within the predefined time interval.

Method 320 may include sending 390 to the computing device over the communication network, an approval for the user to perform the at least one operation in the second computing system using the computing device during the predefined time interval.

In some embodiments, exemplary inventive, specially programmed computing systems/platforms with associated devices are configured to operate in the distributed network environment, communicating with one another over one or more suitable data communication networks, such as communication network 17, (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
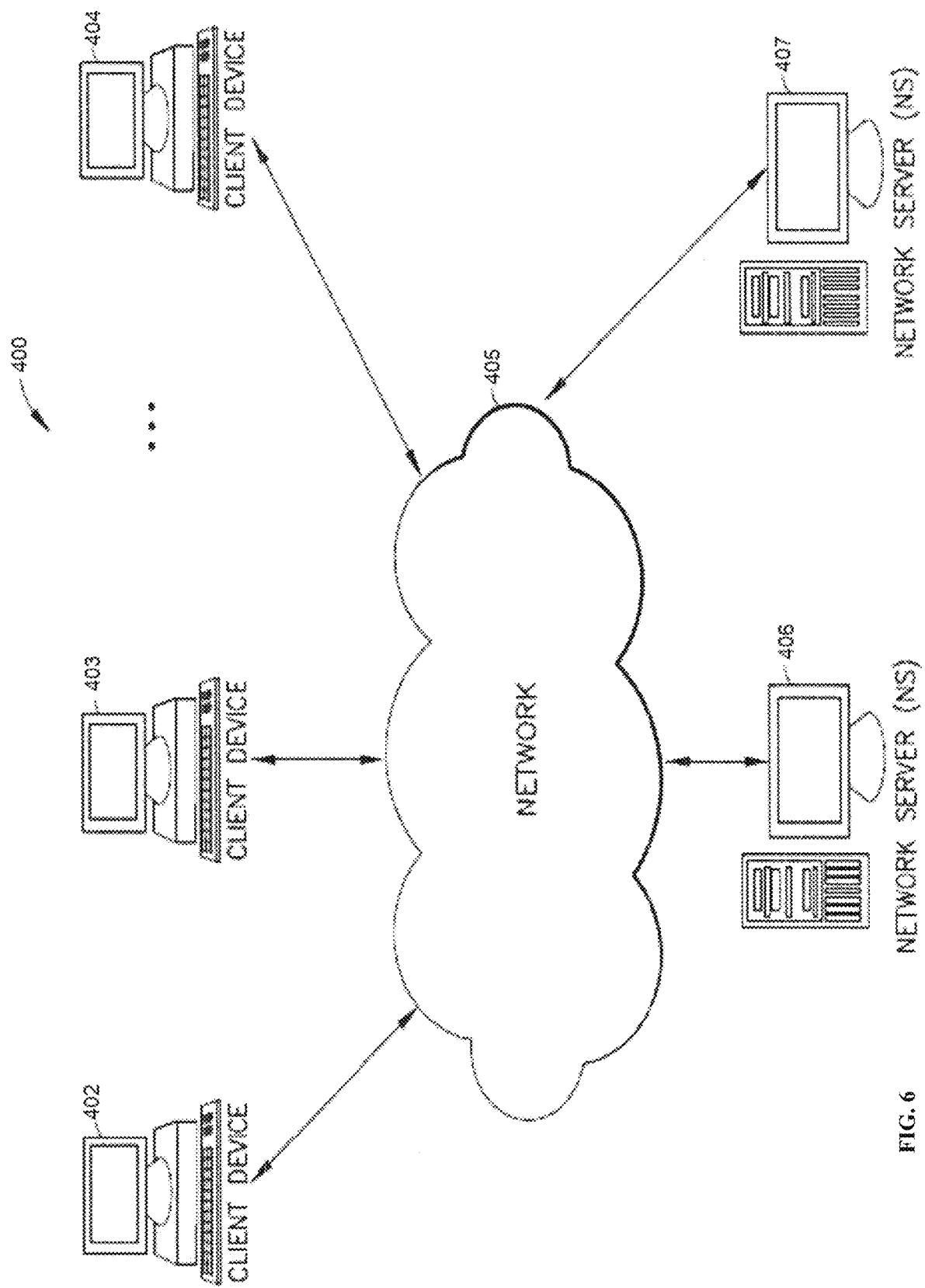
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
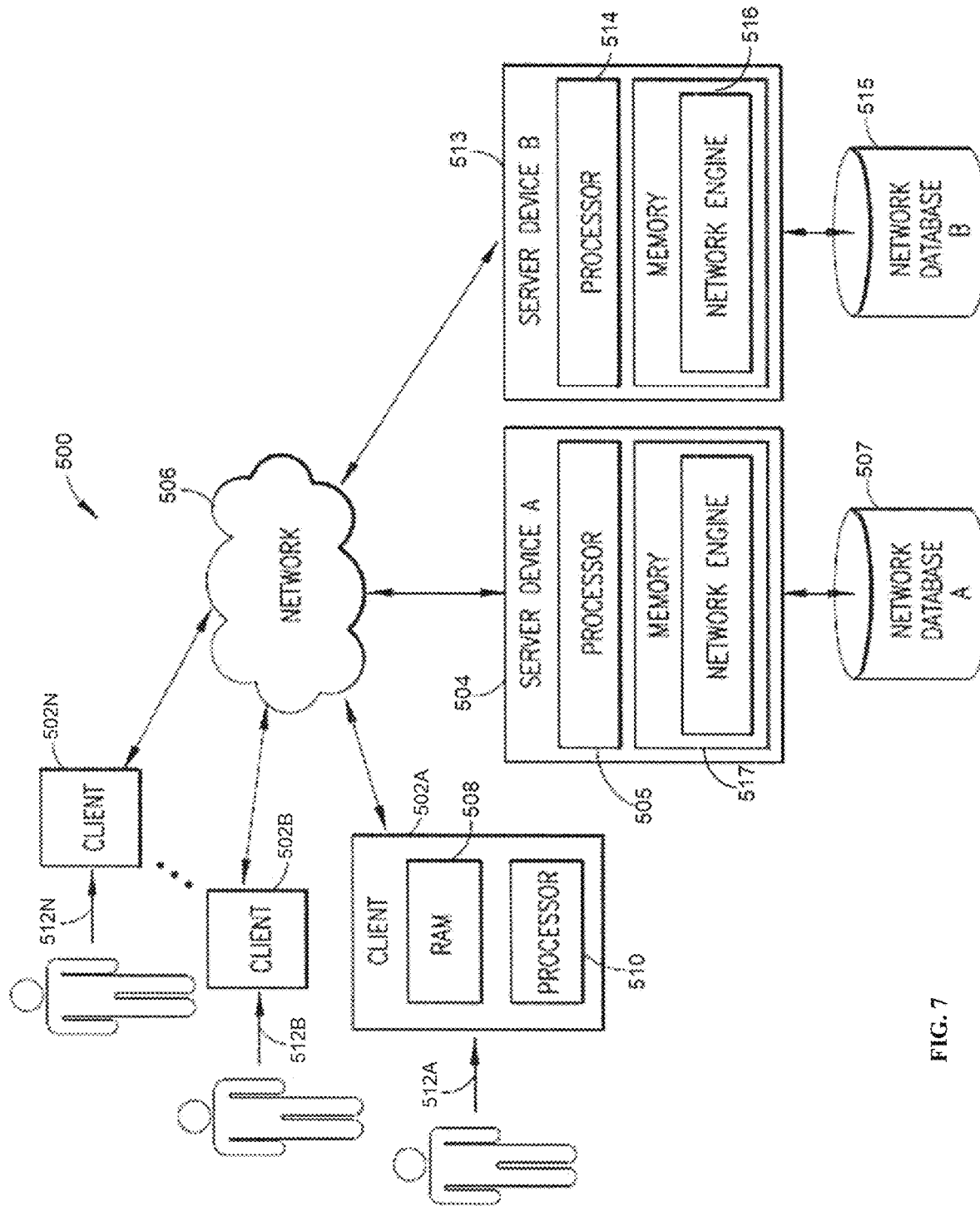
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™ Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
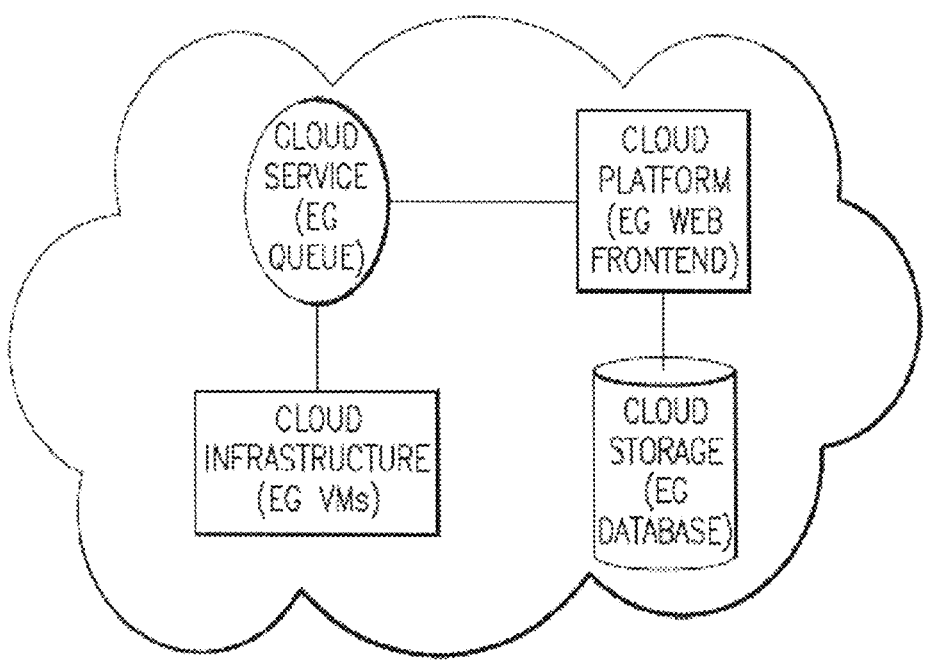
FIGS. 8 and 9 are diagrams illustrating implementations of cloud computing architecture/aspects with respect to which the disclosed technology may be specifically configured to operate, in accordance with one or more embodiments of the present disclosure.
Figure 9:
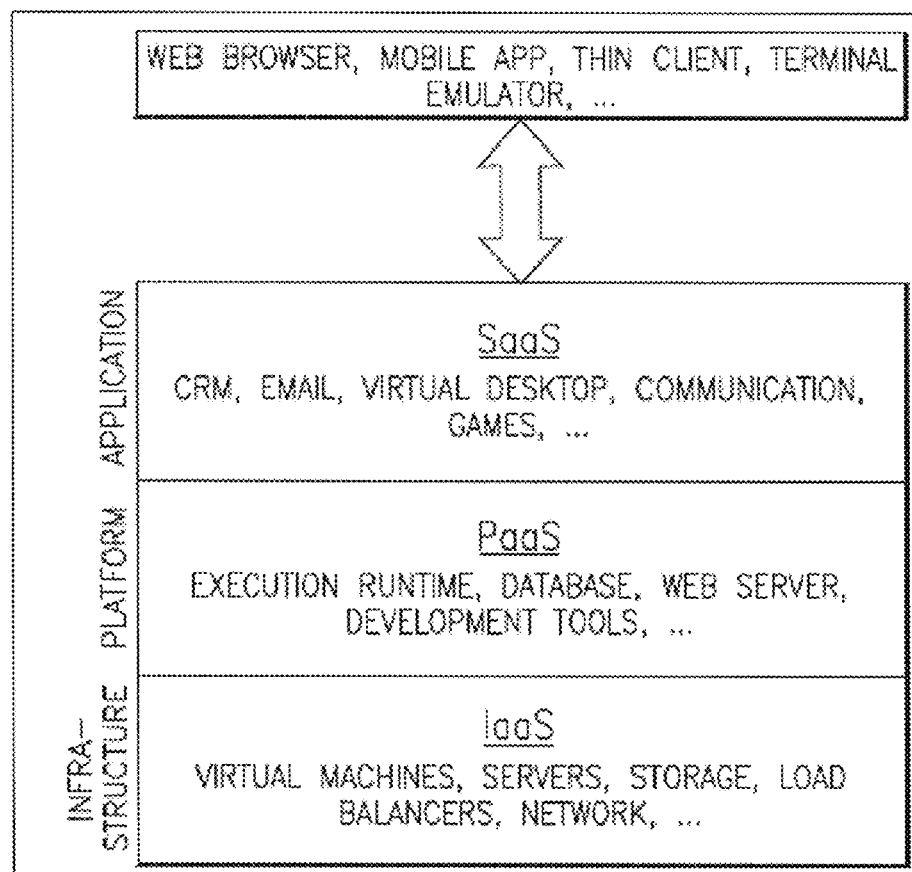

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, a method may include:

receiving, by a processor of a computing device associated with a user over a communication network, first facial image data of the user for identity verification of the user in a first computing system managed by an authorizing entity for authorizing user operations in a plurality of computing systems managed by a plurality of entities;

generating, by the processor of the computing device, a first identity verification record of the user based on the first facial image data of the user;

wherein the first identity verification record may be stored in a memory of the computing device;

obtaining, by the processor of the computing device, using an imaging device of the computing device, second facial image data of the user at a predefined location of a particular entity from the plurality of entities;

authenticating, by the processor, the user to use the computing device at the predefined location of the particular entity from the plurality of entities to perform at least one operation in a second computing system from the plurality of computing systems managed by the particular entity from the plurality of entities when the first facial image data matches the second facial image data;

relaying, by the processor over a communication network to the first computing system of the authorizing entity, a request from the authenticated user for at least one unique authorization identifier;

wherein the request may include an identification of the particular entity;

receiving, by the processor over the communication network, the at least one unique authorization identifier generated by the first computing system;

causing, by the processor, to display the at least one unique authorization identifier on a display of the computing device of the user;

receiving, by the processor, a location of the computing device and a timestamp when a computing terminal of the particular entity scans the at least one unique authorization identifier displayed on the display of the computing device of the authenticated user;

relaying, by the processor to the first computing system, an authorization request to the first computing system over the communication network;

wherein the authorization request may include the at least one unique authorization identifier generated for the particular entity, the location of the computing device, and the timestamp;

receiving, by the processor over the communication network from the first computing system, in response to the authorization request, an approval for the user to perform the at least one operation in the second computing system managed by the particular entity during a predefined time interval; and wherein the approval may be generated when the first computing system verifies that:
  (i) the location of the computing device matches the predefined location of the computing terminal managed by the particular entity; and
  (ii) the timestamp that the at least one unique authorization identifier was scanned is within the predefined time interval.

In some embodiments, the first facial image data may be reference facial image data stored on the backend server and/or on the computing device of the user. The second facial image data may be the facial image data acquired as a selfie, e.g., where the user or another person, for example, takes a picture (e.g., facial image data) of the user using an imaging device on the computing device (e.g., smartphone or tablet of the user).

In some embodiments, causing to display the at least one unique authorization identifier on the display may include displaying the at least one unique authorization identifier selected from the group consisting of a quick response (QR) code, a barcode, and a personal account number (PAN) code.

In some embodiments, obtaining using the imaging device, the second facial image data of the user may include obtaining the second facial image data of the user from a picture of the user on a government identification card, or a self-portrait digital photograph (selfie) of the user.

In some embodiments, the at least one unique authorization identifier may include a virtual credit card number.

In some embodiments, receiving the approval for the user to perform the at least one operation in the second computing system managed by the particular entity may include receiving the approval to perform transactions with the particular entity using the virtual credit card number.

In some embodiments, the computing device associated with the user may include a cellphone, a smartphone, or a tablet.

In some embodiments, the authorizing entity may include a financial institution; wherein the particular entity comprises a business of a merchant; and wherein the predefined location may include a location of the business of the merchant.

In some embodiments, receiving the location of the computing device may include identifying the location of the computing device as the location of the computing terminal of the particular entity scans the at least one unique authorization identifier displayed on the display of the computing device.

In some embodiments, a computing device may include a memory and a processor.

The processor may be configured to:

receive over a communication network, first facial image data of a user for identity verification of the user in a first computing system managed by an authorizing entity for authorizing user operations in a plurality of computing systems managed by a plurality of entities;

generate first identity verification record of the user based on the first facial image data of the user;

wherein the first identity verification record may be stored in a memory of the computing device;

obtain using an imaging device of the computing device, second facial image data of the user at a predefined location of a particular entity from the plurality of entities;

authenticate the user to use the computing device at the predefined location of the particular entity from the plurality of entities to perform at least one operation in a second computing system from the plurality of computing systems managed by the particular entity from the plurality of entities when the first facial image data matches the second facial image data;

relay over the communication network to the first computing system of the authorizing entity, a request from the authenticated user for at least one unique authorization identifier;

wherein the request may include an identification of the particular entity;

receive the at least one unique authorization identifier generated by the first computing system;

cause to display the at least one unique authorization identifier on a display of the computing device of the user;

receive a location of the computing device and a timestamp when a computing terminal of the particular entity scans the at least one unique authorization identifier displayed on the display of the computing device of the authenticated user;

relay an authorization request to the first computing system over the communication network;

wherein the authorization request may include the at least one unique authorization identifier generated for the particular entity, the location of the computing device, and the timestamp;

receive from the first computing system, in response to the authorization request, an approval for the user to perform operations in the second computing system managed by the particular entity during a predefined time interval; and wherein the approval may be generated when the first computing system verifies that:
  (i) the location of the computing device matches the predefined location of the computing terminal managed by the particular entity; and
  (ii) the timestamp that the at least one unique authorization identifier was scanned is within the predefined time interval.

In some embodiments, the processor may be configured to cause to display the at least one unique authorization identifier on the display by displaying the at least one unique authorization identifier selected from the group consisting of a quick response (QR) code, a barcode, and a personal account number (PAN) code.

In some embodiments, the processor may be configured to obtain using the imaging device, the second facial image data of the user by obtaining the second facial image data of the user from a picture of the user on a government identification card, or a self-portrait digital photograph (selfie) of the user.

In some embodiments, the at least one unique authorization identifier may include a virtual credit card number.

In some embodiments, the processor may be configured to receive the approval for the user to perform the at least one operation in the second computing system managed by the particular entity by receiving the approval to perform transactions with the particular entity using the virtual credit card number.

In some embodiments, the computing device associated with the user may include a cellphone, a smartphone, or a tablet.

In some embodiments, the authorizing entity may include a financial institution, the particular entity may include a business of a merchant, and the predefined location may include a location of the business of the merchant.

In some embodiments, the processor may be configured to receive the location of the computing device by identifying the location of the computing device as the location of the computing terminal of the particular entity scans the at least one unique authorization identifier displayed on the display of the computing device.

A method may include:

sending, by a processor of a server of a first computing system managed by an authorizing entity, first facial image data of the user for identity verification of the user for authorizing user operations in a plurality of computing systems managed by a plurality of entities to a computing device associated with a user over a communication network;

receiving, by the processor, a request for at least one unique authorization identifier from the computing device;

wherein the request may include an identification of a particular entity from the plurality of entities;

wherein the user may be authenticated to use the computing device at a predefined location of the particular entity from the plurality of entities to perform at least one operation in a second computing system from the plurality of computing systems managed by the particular entity from the plurality of entities;

generating, by the processor, the at least one unique authorization identifier for the particular entity identified in the request;

sending, by the processor, the at least one unique authorization identifier to the computing device over the communication network;

receiving, by the processor, an authorization request over the communication network from the computing device;

wherein the authorization request may include the at least one unique authorization identifier generated for the particular entity, a location of the computing device, and a timestamp when a computing terminal managed by the particular entity scans the at least one unique authorization identifier displayed on a display of the computing device of the authenticated user;

authorizing, by the processor, in response to the authorization request, the user to perform the at least one operation in the second computing system managed by the particular entity during a predefined time interval upon verifying that:
  (i) the location of the computing device matches the predefined location of the computing terminal managed by the particular entity; and
  (ii) the timestamp that the at least one unique authorization identifier was scanned is within the predefined time interval; and sending, by the processor, to the computing device over the communication network, an approval for the user to perform the at least one operation in the second computing system using the computing device during the predefined time interval.

In some embodiments, the at least one unique authorization identifier may include a virtual credit card number.

In some embodiments, authorizing the user may include authorizing the user to perform transactions with the particular entity using the virtual credit card number.

In some embodiments, the authorizing entity may include a financial institution, the particular entity may include a business of a merchant, and the predefined location may include a location of the business of the merchant.

In some embodiments, a method may include:

obtaining, by a processor, of a computing device associated with a user over a communication network, using an imaging device of the computing device, facial image data of the user;

authenticating, by the processor, the user to use the computing device at a predefined location of a particular entity from a plurality of entities to perform at least one operation in a first computing system from a plurality of computing systems managed by the particular entity from the plurality of entities when the facial image data matches reference facial image data;

wherein the reference facial image data may be stored in a memory of the computing device;

relaying, by the processor, over a communication network to a second computing system in the plurality of computing system managed by an authorizing entity for authorizing user operations in the plurality of computing systems managed by the plurality of entities, a request from the authenticated user for at least one unique authorization identifier;

wherein the request may include an identification of the particular entity;

receiving, by the processor, over the communication network, the at least one unique authorization identifier generated by the second computing system;

causing, by the processor, to display the at least one unique authorization identifier on a display of the computing device of the user;

receiving, by the processor, a location of the computing device and a timestamp when a computing terminal of the particular entity scans the at least one unique authorization identifier displayed on the display of the computing device of the authenticated user;

relaying, by the processor, to the second computing system, an authorization request to the second computing system over the communication network;

wherein the authorization request may include the at least one unique authorization identifier generated for the particular entity, the location of the computing device, and the timestamp;

receiving, by the processor, over the communication network from the second computing system, in response to the authorization request, an approval for the user to perform the at least one operation in the first computing system managed by the particular entity during a predefined time interval; and wherein the approval may be generated when the second computing system verifies that:
  (i) the location of the computing device matches the predefined location of the computing terminal managed by the particular entity; and
  (ii) the timestamp that the at least one unique authorization identifier was scanned is within the predefined time interval.

In some embodiments, a method may include:

receiving, by a processor, of a server of a first computing system managed by an authorizing entity over a communication network, a request for at least one unique authorization identifier from a computing device associated with a user;

wherein the request may include an identification of a particular entity from a plurality of entities;

wherein the user may be authenticated to use the computing device at a predefined location of the particular entity from the plurality of entities to perform at least one operation in a second computing system from the plurality of computing systems managed by the particular entity from the plurality of entities;

generating, by a processor, the at least one unique authorization identifier for the particular entity identified in the request;

sending, by the processor, the at least one unique authorization identifier to the computing device over the communication network;

receiving, by the processor, an authorization request over the communication network from the computing device;

wherein the authorization request may include the at least one unique authorization identifier generated for the particular entity, a location of the computing device, and a timestamp when a computing terminal managed by the particular entity scans the at least one unique authorization identifier displayed on a display of the computing device of the authenticated user;

authorizing, by the processor, in response to the authorization request, the user to perform the at least one operation in the second computing system managed by the particular entity during a predefined time interval upon verifying that:
(i) the location of the computing device matches the predefined location of the computing terminal managed by the particular entity; and
(ii) the timestamp that the at least one unique authorization identifier was scanned is within the predefined time interval; and sending, by the processor, to the computing device over the communication network, an approval for the user to perform the at least one operation in the second computing system using the computing device during the predefined time interval.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
receiving, by a processor, of a computing device associated with a user over a communication network, first facial image data of the user for identity verification of the user in a first computing system managed by an authorizing entity for authorizing user operations in a plurality of computing systems managed by a plurality of entities;
generating, by the processor, a first identity verification record of the user based on the first facial image data of the user;
wherein the first identity verification record is stored in a memory of the computing device;
obtaining, by the processor, using an imaging device of the computing device, second facial image data of the user at a predefined location of a particular entity from the plurality of entities;
authenticating, by the processor, the user to use the computing device at the predefined location of the particular entity from the plurality of entities to perform at least one operation in a second computing system from the plurality of computing systems managed by the particular entity from the plurality of entities when the first facial image data matches the second facial image data;
relaying, by the processor, over a communication network to the first computing system of the authorizing entity, a request from the authenticated user for at least one unique authorization identifier;
wherein the request comprises an identification of the particular entity;
receiving, by the processor, over the communication network, the at least one unique authorization identifier generated by the first computing system;
causing, by the processor, to display the at least one unique authorization identifier on a display of the computing device of the user;
receiving, by the processor, a location of the computing device and a timestamp when a computing terminal of the particular entity scans the at least one unique authorization identifier displayed on the display of the computing device of the authenticated user;
relaying, by the processor, to the first computing system, an authorization request to the first computing system over the communication network;
wherein the authorization request comprises the at least one unique authorization identifier generated for the particular entity, the location of the computing device, and the timestamp;
receiving, by the processor, over the communication network from the first computing system, in response to the authorization request, an approval for the user to perform the at least one operation in the second computing system managed by the particular entity during a predefined time interval; and
wherein the approval is generated when the first computing system verifies that:
(i) the location of the computing device matches the predefined location of the computing terminal managed by the particular entity; and
(ii) the timestamp that the at least one unique authorization identifier was scanned is within the predefined time interval.

2. The method according to claim 1, wherein causing to display the at least one unique authorization identifier on the display comprises displaying the at least one unique authorization identifier selected from the group consisting of a quick response (QR) code, a barcode, and a personal account number (PAN) code.

3. The method according to claim 1, wherein obtaining using the imaging device, the second facial image data of the user comprises obtaining the second facial image data of the user from a picture of the user on a government identification card, or a self-portrait digital photograph (selfie) of the user.

4. The method according to claim 1, wherein the at least one unique authorization identifier comprises a virtual credit card number.

5. The method according to claim 4, wherein receiving the approval for the user to perform the at least one operation in the second computing system managed by the particular entity comprises receiving the approval to perform transactions with the particular entity using the virtual credit card number.

6. The method according to claim 1, wherein the computing device associated with the user comprises a cellphone, a smartphone, or a tablet.

7. The method according to claim 1, wherein the authorizing entity comprises a financial institution; wherein the particular entity comprises a business of a merchant; and wherein the predefined location comprises a location of the business of the merchant.

8. The method according to claim 1, wherein receiving the location of the computing device comprises identifying the location of the computing device as the location of the computing terminal of the particular entity scans the at least one unique authorization identifier displayed on the display of the computing device.

9. A computing device, comprising:
a non-transitory memory;
a processor configured to:
receive over a communication network, first facial image data of a user for identity verification of the user in a first computing system managed by an authorizing entity for authorizing user operations in a plurality of computing systems managed by a plurality of entities;
generate first identity verification record of the user based on the first facial image data of the user;
wherein the first identity verification record is stored in a memory of the computing device;
obtain using an imaging device of the computing device, second facial image data of the user at a predefined location of a particular entity from the plurality of entities;
authenticate the user to use the computing device at the predefined location of the particular entity from the plurality of entities to perform at least one operation in a second computing system from the plurality of computing systems managed by the particular entity from the plurality of entities when the first facial image data matches the second facial image data;
relay over the communication network to the first computing system of the authorizing entity, a request from the authenticated user for at least one unique authorization identifier;
wherein the request comprises an identification of the particular entity;
receive the at least one unique authorization identifier generated by the first computing system;
cause to display the at least one unique authorization identifier on a display of the computing device of the user;
receive a location of the computing device and a timestamp when a computing terminal of the particular entity scans the at least one unique authorization identifier displayed on the display of the computing device of the authenticated user;
relay an authorization request to the first computing system over the communication network;
wherein the authorization request comprises the at least one unique authorization identifier generated for the particular entity, the location of the computing device, and the timestamp;
receive from the first computing system, in response to the authorization request, an approval for the user to perform operations in the second computing system managed by the particular entity during a predefined time interval; and
wherein the approval is generated when the first computing system verifies that:
(i) the location of the computing device matches the predefined location of the computing terminal managed by the particular entity; and
(ii) the timestamp that the at least one unique authorization identifier was scanned is within the predefined time interval.

10. The computing device according to claim 9, wherein the processor is configured to cause to display the at least one unique authorization identifier on the display by displaying the at least one unique authorization identifier selected from the group consisting of a quick response (QR) code, a barcode, and a personal account number (PAN) code.

11. The computing device according to claim 9, wherein the processor is configured to obtain using the imaging device, the second facial image data of the user by obtaining the second facial image data of the user from a picture of the user on a government identification card, or a self-portrait digital photograph (selfie) of the user.

12. The computing device according to claim 9, wherein the at least one unique authorization identifier comprises a virtual credit card number.

13. The computing device according to claim 12, wherein the processor is configured to receive the approval for the user to perform the at least one operation in the second computing system managed by the particular entity by receiving the approval to perform transactions with the particular entity using the virtual credit card number.

14. The computing device according to claim 9, wherein the computing device associated with the user comprises a cellphone, a smartphone, or a tablet.

15. The computing device according to claim 9, wherein the authorizing entity comprises a financial institution; wherein the particular entity comprises a business of a merchant; and wherein the predefined location comprises a location of the business of the merchant.

16. The computing device according to claim 9, wherein the processor is configured to receive the location of the computing device by identifying the location of the computing device as the location of the computing terminal of the particular entity scans the at least one unique authorization identifier displayed on the display of the computing device.

17. A method, comprising:
sending, by a processor, of a server of a first computing system managed by an authorizing entity, first facial image data of the user for identity verification of the user for authorizing user operations in a plurality of computing systems managed by a plurality of entities to a computing device associated with a user over a communication network;
receiving, by the processor, a request for at least one unique authorization identifier from the computing device;
wherein the request comprises an identification of a particular entity from the plurality of entities;
wherein the user is authenticated to use the computing device at a predefined location of the particular entity from the plurality of entities to perform at least one operation in a second computing system from the plurality of computing systems managed by the particular entity from the plurality of entities;
generating, by the processor, the at least one unique authorization identifier for the particular entity identified in the request;
sending, by the processor, the at least one unique authorization identifier to the computing device over the communication network;
receiving, by the processor, an authorization request over the communication network from the computing device;
wherein the authorization request comprises the at least one unique authorization identifier generated for the particular entity, a location of the computing device, and a timestamp when a computing terminal managed by the particular entity scans the at least one unique authorization identifier displayed on a display of the computing device of the authenticated user;
authorizing, by the processor, in response to the authorization request, the user to perform the at least one operation in the second computing system managed by the particular entity during a predefined time interval upon verifying that:

(i) the location of the computing device matches the predefined location of the computing terminal managed by the particular entity; and (ii) the timestamp that the at least one unique authorization identifier was scanned is within the predefined time interval; and sending, by the processor, to the computing device over the communication network, an approval for the user to perform the at least one operation in the second computing system using the computing device during the predefined time interval.

18. The method according to claim 17, wherein the least one unique authorization identifier comprises a virtual credit card number.

19. The method according to claim 18, wherein authorizing the user comprises authorizing the user to perform transactions with the particular entity using the virtual credit card number.

20. The method according to claim 17, wherein the authorizing entity comprises a financial institution; wherein the particular entity comprises a business of a merchant; and wherein the predefined location comprises a location of the business of the merchant.

\* \* \* \* \*